United States Patent Office 2,703,672
Patented Mar. 8, 1955

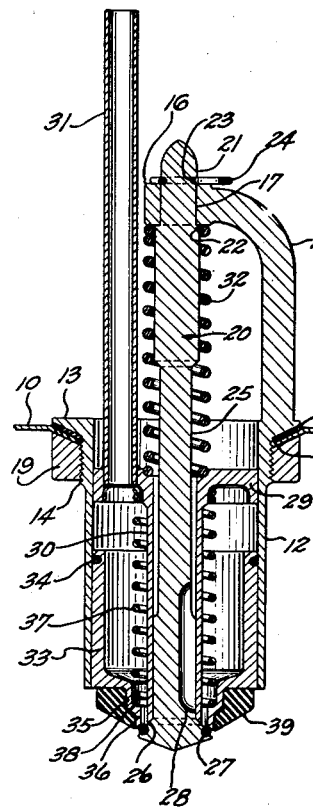

2,703,672

VESSEL FILLING DEVICE

Ranold F. Quam, Fort Atkinson, Wis.

Application August 8, 1952, Serial No. 303,330

10 Claims. (Cl. 226—124)

This invention relates to improvements in vessel filling devices.

In filling vessels such as bottles or the like with liquids such as milk, the tendency of said liquids to foam, when conventional vessel filling valves are used, seriously hampers the filling operation. This necessitates slowing down of the filling operation to a rate at which a minimum amount of foam is produced in the vessel during the filling thereof.

It is a general object of the present invention to provide an improved vessel filling device for rapidly filling vessels with a liquid, said device being so constructed that foaming of the liquid has no substantial effect upon the filling operation.

A further object of the invention is to provide an improved vessel filling device which is adapted for use on pedestal type filling machines, said device having a relatively short operating stroke which facilitates its incorporation into any pedestal type machine.

A further object of the invention is to provide an improved vessel filling device of the class described which is so constructed that the liquid entering a vessel through said device is deflected toward the side walls of the vessel to thereby reduce the tendency of the liquid to foam.

A further object of the invention is to provide an improved vessel filling device of the class described which is so constructed that the velocity of flow of the fluid issuing from the device is only sufficient to project the fluid into contact with the side wall of the vessel, thereby eliminating all high velocity splashing and undue turbulence within the vessel which would normally cause foaming.

A further object of the invention is to provide an improved vessel filling device of the class described which is quickly and easily disassembled and cleaned, and is therefore well adapted for use in the food industry.

A further object of the invention is to provide an improved vessel filling device which is strong and durable, positive in operation, and leakproof.

A further object of the invention is to provide an improved vessel filling device which is simple in construction, and inexpensive to manufacture.

With the above and other objects in view, the invention consists of the improved vessel filling device and all of its parts and combinations, as set forth in the claims, and all equivalents thereof.

In the drawing accompanying and forming a part of this specification, wherein one complete embodiment of the preferred form of the invention is shown, and wherein like characters of reference indicate the same parts in all of the views:

Fig. 1 is a vertical sectional view of the improved vessel filling device in closed position, said view being taken approximately along the line 1—1 of Fig. 5;

Fig. 2 is a fragmentary view similar to Fig. 1 showing the lower sleeve of the device raised to an intermediate position by a vessel lifted upwardly thereagainst;

Fig. 3 is a view similar to Fig. 1 showing the parts of the device in vessel filling position;

Fig. 4 is a bottom view of the improved device shown in Fig. 1; and

Fig. 5 is a plan view of the improved device.

Referring more particularly to the drawing, the numeral 10 indicates the bottom wall of a tank, filler bowl, or other suitable receptacle in which the fluid to be handled by the improved device is stored. The bottom wall 10 is formed with an aperture 11, the portions of said wall at the margin of said aperture being preferably depressed as shown. The numeral 12 indicates a vertically disposed cylindrical sleeve forming a valve body and having one end formed with an outwardly directed angular flange 13, the under side of which is frustoconical to conform to the contour of the bottom wall 10 at the margin of the aperture 11. Sleeve 12 is formed with a threaded portion 14 below the flange 13, and has a U-shaped member 15 projecting upwardly from the outer surface of the flange 13, the member 15 being formed with a hub 16, which hub has a bore 17 coaxial with the sleeve 12.

The sleeve 12 is positioned in the aperture 11, with the flange 13 positioned on a gasket 18, there being a nut 19 threaded on the threaded portion 14 below the wall 10 to securely hold the valve body 12 in operative position sealed to the wall 10. A rod or stem 20 has an upper end portion 21 of reduced diameter forming a shoulder 22. The portion 21 is positioned in the bore 17 of hub 16, and also is formed with an external annular groove 23 adjacent the hub 16 for receiving a retaining clip 24. Clip 24 and shoulder 22 coact to hold the rod 20 in operative position in bore 17. Rod 20 is formed with a second portion of reduced diameter 25 which extends coaxially within the sleeve 12. At its lower end rod 20 is formed with an outwardly flaring conical valve seat 26. The valve seat 26 may have an annular groove in which a resilient sealing ring 27 is received, if the fluid being handled so requires. The sealing ring 27 and its retaining groove may be eliminated, as shown in Figs. 2 and 3 when not required. The lower end portion of the rod 20 is formed with preferably three spaced, external, longitudinal grooves 28, the upper ends of which extend into the portion 25 of reduced diameter. The lower ends of said grooves extend to a location near the valve seat 26 as shown.

A sleeve 30 is positioned in the valve body 21 and is axially slidable on the rod 20. The sleeve 30 has an annular enlargement 29 at its upper end forming a piston which may, if desired, be formed with an external annular groove to receive a resilient sealing ring 41 as shown in Fig. 2. The sleeve 30 has its lower end formed with an internal annular beveled surface for sealing engagement with the valve seat 26. The piston 29 is provided with an upwardly projecting vent pipe 31 which is laterally offset from the sleeve 30 and which communicates with the under side of said piston. A relatively strong helical compression spring 32 is positioned around the rod 20, and has its upper end abutting the hub 16, and its lower end abutting the upper end of the sleeve 30 to urge the latter downwardly into sealing engagement with the valve seat 26.

A sleeve 33 is sealingly and axially slidably positioned in the valve body 12 below the piston 29. The upper end of the sleeve 33 may be formed with an external annular groove to receive a resilient sealing ring 34. The lower end of the sleeve 33 is formed with a reduced portion 35, and terminates in a further reduced portion 36 forming an internal shoulder 38. The portion 36 has a larger diameter than the sleeve 30 and is spaced radially outwardly from the outer surface of said sleeve to form an annular fluid spassage therebetween. The lower end of portion 36 is formed with an internally beveled annular surface to sealingly engage the sealing ring 27, or in the absence of such ring, to sealingly engage the valve seat 26.

A helical compression spring 37, which is weaker than the spring 32, surrounds the sleeve 30 and has its upper end in abutment with the lower surface of the piston 29, the lower end of the spring 37 abutting the shoulder 38 of sleeve 33. Portions 35 and 36 of sleeve 33 are surrounded by an annular resilient sealing ring 39 for engaging the mouth of a vessel, which ring is press-fitted against the lower end surface of the sleeve 33. As shown in Fig. 4, the ring 39 may be formed with slightly raised radially extending ribs 40 for a purpose to be later described.

*Operation*

The parts of the improved device are normally in the positions shown in Fig. 1, wherein the lower end of the sleeve 30 sealingly engages the valve seat 26, and the lower end of portion 36 of sleeve 33 sealingly engages the ring 27, or in the absence of such ring, the valve seat 26. Valve action is started by placing the mouth of a vessel, such as a bottle 42, coaxially against the vessel mouth sealing ring 39, and pushing the bottle 42 upwardly against said ring. This raises the sleeve 33 against the action of spring 37, spring 32 being sufficiently strong to resist deformation until sleeve 33 is moved into contact with piston 29, as shown in Fig. 2. Lifting of the lower piston lifts portion 36 of sleeve 33 off ring 27, or valve seat 26 as the case may be (also shown in Fig. 2), and provides communication between the interior of sleeve 33 and the interior of the bottle 42. This permits part or all of the liquid which may be in said sleeve to flow into the bottle 42, depending on the speed with which the bottle is elevated.

When sleeve 33 engages piston 29, further lifting of the bottle 42 causes lifting of the sleeve 30 against the action of spring 32. As sleeve 30 is raised to the position shown in Fig. 3, its lower end moves away from the valve seat 26 and exposes the lower ends of the grooves 28 within the bottle 42 as shown. This permits the fluid in the filler bowl to flow downwardly through the annular space between the portion 25 of rod 20 and sleeve 30, through the grooves 28 and into the bottle 42. The contour of the lower ends of the grooves 28 is such that the fluid issuing therefrom is deflected outwardly against the inner wall surface of the adjacent portion of the bottle 42. The diameter of the portion 25 of rod 20 is such that the space between said portion and sleeve 30 limits the rate of fluid flow therethrough to a predetermined velocity which is only sufficient to cause the fluid issuing from said grooves to reach the inner wall surface of the bottle 42 without substantial splashing. The fluid thus flows down the inner wall surface of the bottle 42 and fills the bottle with a minimum of turbulence and foaming.

As the fluid entering the bottle 42 issues from the grooves 28 in the form of three spaced streams, the air and any foam in the vessel passes upward, as indicated by the arrows in Fig. 3, through the annular space between sleeve 30 and the portion 35 of sleeve 33, through the sleeve 33, and out the vent tube 31. The upper end of tube 31 is normally positioned above the level of the liquid in the filler bowl or tank. If desired, the vent tube 31 may be connected to a suitable source of vacuum to increase the rate of fluid flow through the improved device.

The parts of the improved device are held in the open position shown in Fig. 3 until the bottle 42 has been filled, all of the foam and some of the clear liquid from the filled bottle being passed upwardly into sleeve 33 to insure complete filling of the bottle 42. The bottle 42 is then lowered to thereby move sleeve 30 onto the valve seat 26, closing off the lower ends of grooves 28 and shutting off the flow of fluid into the bottle 42. Continued lowering of the bottle 42 moves the mouth of the bottle out of contact with the vessel-mouth sealing ring 39, and during such movement, the ribs 40 aid in breaking said sealing engagement.

Any desired amount of air space can be provided in the filled bottle 42 above the liquid therein by forming the lower tip of rod 20 below sealing ring 39 in the required size to displace the desired amount of liquid in the filled bottle, the tip 20 remaining in the bottle after the valve is shut and until the bottle is moved out of engagement.

The improved device is positive in operation and fills the bottles with a minimum of foaming. The construction of the device is such that even if foaming occurs, it has no detrimental effect on the filling operation. The improved device can be quickly disassembled by merely removing the clip 24 from the upper end of rod 20, thus permitting all of the valve parts within the body 12 to be withdrawn from the lower end of said body. After withdrawal, the valve parts can be quickly and easily cleaned. Reassembly of the improved device is substantially the reverse of disassembly.

Various changes and modifications may be made without departing from the spirit of the invention, and all of such changes are contemplated as may come within the scope of the claims.

What I claim is:

1. In a vessel filling device: a fixedly mounted vertical rod having an external annular shoulder forming a valve seat and having means including a longitudinal liquid inlet passage communicating with a source of liquid, the lower end of said passage being positioned adjacent said valve seat; a first sleeve axially slidable on said rod and having an annular lower end portion normally seated on said valve seat and closing the lower end of said longitudinal liquid passage; a vertically slidably mounted second sleeve coaxially surrounding said rod and first sleeve, said second sleeve having an annular lower end portion normally seated on said valve seat and of larger diameter than the annular lower end portion of the first sleeve to form an annular air space between said two sleeve portions; venting means communicating with said annular air space; said second sleeve having means adapted to be engaged by the mouth of a vessel during use; and abutment means on the first sleeve positioned to be engaged by said second sleeve in response to predetermined lifting of the second sleeve off of the valve seat, whereby said first sleeve is lifted off of the valve seat by said second sleeve to open the lower end of said liquid inlet passage.

2. In a vessel filling device: a fixedly mounted vertical rod having an external annular shoulder forming a valve seat and having means including a longitudinal liquid inlet passage communicating with a source of liquid, the lower end of said passage being positioned adjacent said valve seat; a first sleeve axially slidable on said rod and having an annular lower end portion normally seated on said valve seat and closing the lower end of said longitudinal liquid passage; a vertically slidably mounted second sleeve coaxially surrounding said rod and first sleeve, said second sleeve having an annular lower end portion normally seated on said valve seat and of larger diameter than the annular lower end portion of the first sleeve to form an annular air space between said two sleeve portions; spring means acting between said first and second sleeves for urging said second sleeve against said valve seat; venting means communicating with said annular air space; said second sleeve having means adapted to be engaged by the mouth of a vessel during use; and abutment means on the first sleeve positioned to be engaged by said second sleeve in response to predetermined lifting of the second sleeve off of the valve seat against the action of said spring means, whereby said first sleeve is lifted off of the valve seat by said second sleeve to open the lower end of said liquid inlet passage.

3. In a vessel filling device: a fixedly mounted vertical rod having an external annular shoulder forming a valve seat and having means including a longitudinal liquid inlet passage communicating with a source of liquid, the lower end of said passage being positioned adjacent said valve seat; a first sleeve axially slidable on said rod and having an annular lower end portion normally seated on said valve seat and closing the lower end of said longitudinal liquid passage; spring means urging said first sleeve against said valve seat; a vertically slidably mounted second sleeve coaxially surrounding said rod and first sleeve, said second sleeve having an annular lower end portion normally seated on said valve seat and of larger diameter than the annular lower end portion of the first sleeve to form an annular air space between said two sleeve portions; venting means communicating with said annular air space; said second sleeve having means adapted to be engaged by the mouth of a vessel during use; and abutment means on the first sleeve positioned to be engaged by said second sleeve in response to predetermined lifting of the second sleeve off the valve seat, whereby said first sleeve is lifted off the valve seat by said second sleeve against the action of said spring means, thereby opening the lower end of said liquid inlet passage.

4. In a vessel filling device: a fixedly mounted vertical rod having an external annular shoulder forming a valve seat and having means including a longitudinal fluid passage communicating with a source of fluid, the lower end of said passage being positioned adjacent said valve seat; a first sleeve axially slidable on said rod and having an annular lower end portion normally seated on said valve seat and closing the lower end of said longitudinal fluid passage; spring means urging said first sleeve against said valve seat; a vertically slidably mounted second sleeve coaxially surrounding said rod and first sleeve, said second sleeve having an annular lower end portion normally seated on said valve seat and of larger diameter than the annular lower end portion of the first sleeve to form an annular fluid space between said two sleeve portions; a shoulder on said first sleeve; a shoulder on said second sleeve; a compression spring of less strength than said spring means having ends in abutment with said sleeve shoulders for urging said second sleeve against said valve seat; venting means communicating with said annular fluid space; said second sleeve having means adapted to be engaged by the mouth of a vessel during use; and abutment means on the first and second sleeves positioned for engagement in response to predetermined lifting of the second sleeve off of the valve seat against the action of said spring, whereby said first sleeve is lifted off the valve seat against the action of said spring means, thereby opening the lower end of said fluid inlet passage.

5. A vessel filling device, comprising: a tubular vertically disposed valve body; a hub fixed coaxially to one end of said valve body; a rod fixed to said hub and extending coaxially within said valve body, said rod having an external annular shoulder forming a valve seat and having means including a longitudinal fluid inlet passage communicating with a source of fluid, the lower end of said passage being positioned adjacent said valve seat; a first sleeve axially slidable on said rod and within said valve body and having an annular lower end portion normally seated on said valve seat and closing the lower end of said longitudinal fluid passage; a compression spring abutting said hub and first sleeve and urging the latter against the valve seat; a second sleeve coaxially slidably mounted within said valve body surrounding said rod and first sleeve, said second sleeve having an annular lower end portion normally seated on said valve seat and of larger diameter than the annular lower end portion of the first sleeve to form an annular fluid space between said two sleeve portions; venting means communicating with said annular fluid space; said second sleeve having means adapted to be engaged by the mouth of a vessel during use; and abutment means on the first and second sleeves positioned for engagement in response to predetermined lifting of the second sleeve off the valve seat, whereby said first sleeve is lifted off the valve seat against the action of said spring, thereby opening the lower end of said fluid inlet passage.

6. A vessel filling device, comprising: a tubular vertically disposed valve body, a hub fixed coaxially to one end of said valve body; a rod fixed to said hub and extending coaxially within said valve body, said rod having an external annular shoulder forming a valve seat and having means including a longitudinal fluid inlet passage communicating with a source of fluid, the lower end of said passage being positioned adjacent said valve seat; a first sleeve axially slidable on said rod and within said valve body and having an annular lower end portion normally seated on said valve seat and closing the lower end of said longitudinal fluid passage; a compression spring abutting said hub and first sleeve and urging the latter against the valve seat; a second sleeve coaxially slidably mounted within said valve body surrounding said rod and first sleeve, said second sleeve having an annular lower end portion normally seated on said valve seat and of larger diameter than the annular lower end portion of the first sleeve to form an annular fluid space between said two sleeve portions; a shoulder on said first sleeve; a shoulder on said second sleeve; a compression spring having its opposite ends in abutment with said sleeve shoulders for urging said second sleeve against said valve seat; venting means communicating with said annular fluid space; said second sleeve having means adapted to be engaged by the mouth of a vessel during use; and abutment means on the first and second sleeves positioned for engagement in response to predetermined lifting of the second sleeve off the valve seat, whereby said first sleeve is lifted off the valve seat against the action of said spring, thereby opening the lower end of said fluid inlet passage.

7. A vessel filling device, comprising: a tubular vertically disposed valve body; a fixedly mounted rod extending coaxially within said valve body having an external annular shoulder forming a valve seat and having means including a longitudinal liquid inlet passage communicating with a source of liquid, the lower end of said passage being positioned adjacent said valve seat; a first sleeve axially slidable on said rod and having an annular enlargement sealingly and slidably engaging the inner surface of said valve body, said sleeve having an annular lower end portion normally seated on said valve seat and closing the lower end of said longitudinal liquid passage; a second sleeve sealingly and slidably engaging the inner surface of said valve body below the enlargement of said first sleeve and surrounding said rod and first sleeve, said second sleeve having a reduced annular lower end portion normally seated on said valve seat and of larger diameter than the annular lower end portion of the first sleeve to form an annular air space between said two sleeve portions; venting means communicating with said annular air space; said second sleeve having means adapted to be engaged by the mouth of a vessel during use, the upper end of said second sleeve being engageable with the enlarged portion of said first sleeve in response to predetermined lifting of the second sleeve off of the valve seat, whereby said first sleeve is lifted off the valve seat by said second sleeve to open the lower end of said liquid inlet passage.

8. A vessel filling device, comprising: a tubular vertically disposed valve body; a fixedly mounted rod extending coaxially within said valve body having an external annular shoulder forming a valve seat and having means including a longitudinal fluid inlet passage communicating with a source of fluid, the lower end of said passage being positioned adjacent said valve seat; a first sleeve axially slidable on said rod and having an annular enlargement sealingly and slidably engaging the inner surface of said valve body, said sleeve having an annular lower end portion normally seated on said valve seat and closing the lower end of said longitudinal fluid passage; a second sleeve coaxially sealingly and slidably engaging the inner surface of said valve body below the enlargement of said first sleeve, said second sleeve having a reduced annular lower end portion forming an internal shoulder and normally seated on said valve seat and of larger diameter than the annular lower end portion of the first sleeve to form an annular fluid space between said two sleeve portions; a compression spring engaging the enlarged portion of said first sleeve and the shoulder of said second sleeve to urge the latter against said valve seat; venting means communicating with said annular fluid space; and a vessel mouth seal on said second sleeve, the upper end of said second sleeve being engageable with the enlarged portion of said first sleeve in response to predetermined lifting of the second sleeve off the valve seat, whereby said first sleeve is lifted off of the valve seat.

9. A vessel filling device, comprising: a tubular vertically disposed valve body; a fixedly mounted rod extending coaxially within said valve body having an external annular shoulder forming a valve seat and having means including a longitudinal fluid inlet passage communicating with a source of fluid, the lower end of said passage being positioned adjacent said valve seat; a first sleeve axially slidable on said rod and having an annular enlargement sealingly and slidably engaging the inner surface of said valve body, said sleeve having an annular lower end portion normally seated on said valve seat and closing the lower end of said longitudinal fluid passage; spring means urging said first sleeve against said valve seat; a second sleeve coaxially sealingly and slidably engaging the inner surface of said valve body below the enlargement of said first sleeve, said second sleeve having a reduced annular lower end portion forming an internal shoulder and normally seated on said valve seat and of larger diameter than the annular lower end portion of the first sleeve to form an annular fluid space between said two sleeve portions; a compression spring of less strength than said spring means engaging the enlarged portion of said first sleeve and the shoulder of said second sleeve to urge the latter against said valve seat; venting means communicating with said annular fluid space; and a vessel mouth seal on said second sleeve, the upper end of said second sleeve being engageable with the enlarged portion of said first sleeve in response to predetermined lifting of the second sleeve off the valve seat, whereby said first sleeve is lifted off of the valve seat.

10. A vessel filling device, comprising: a tubular vertically disposed valve body; a hub fixed coaxially to and spaced above the upper end of said valve body; a rod fixed to and depending from said hub coaxially within said valve body, said rod having a lower end portion formed with an external annular shoulder providing a valve seat, said rod also having means including a longitudinal fluid inlet passage communicating with a source of fluid, the lower end of said passage being positioned adjacent said valve seat; a first sleeve axially slidable on said rod and having an annular enlargement sealingly and slidably engaging the inner surface of said valve body, said sleeve having an annular lower end portion normally seated on said valve seat and closing the lower end of said longitudinal passage; a second sleeve coaxially and sealingly slidably engaging the inner surface of said valve body below the enlargement of said first sleeve, said second sleeve having a reduced annular lower end portion forming an internal shoulder, said portion being normally seated on said valve seat and having a larger diameter than the annular lower end portion of the first sleeve to form an annular fluid space between said two sleeve portions; a first helical compression spring surrounding said rod and having its ends in abutment with said hub and with said first sleeve urging the latter downwardly against said valve seat; a second helical compression spring weaker than said first spring surrounding said first sleeve and having its opposite ends in abutment with the enlargement of said sleeve and with said internal shoulder urging the second sleeve downwardly onto said valve seat; venting means communicating with said annular fluid space; said second sleeve having means adapted to be engaged by the mouth of a vessel during use, the upper end of said sleeve being engageable with the enlarged portion of said first sleeve in response to predetermined lifting of the second sleeve off the valve seat, whereby said first sleeve is lifted off the valve seat to open the lower end of said fluid inlet passage.

References Cited in the file of this patent

UNITED STATES PATENTS

| | | |
|---|---|---|
| 668,303 | Beyer | Feb. 19, 1901 |
| 2,363,543 | Miller | Nov. 28, 1944 |